US011265312B2

(12) United States Patent
Frigerio et al.

(10) Patent No.: US 11,265,312 B2
(45) Date of Patent: Mar. 1, 2022

(54) TELECOMMUNICATION SYSTEM FOR THE SECURE TRANSMISSION OF DATA THEREIN AND DEVICE ASSOCIATED THEREWITH

(71) Applicants: Tommaso Frigerio, Milan (IT); Luca Rizzuti, Lauria PZ (IT)

(72) Inventors: Tommaso Frigerio, Milan (IT); Luca Rizzuti, Lauria PZ (IT)

(73) Assignee: AREAWFI, INTEGRATED SYSTEM S.R.L., Milan (IT)

( * ) Notice: Subject to any disclaimer, the term of this patent is extended or adjusted under 35 U.S.C. 154(b) by 463 days.

(21) Appl. No.: 15/576,924

(22) PCT Filed: May 26, 2016

(86) PCT No.: PCT/IB2016/053084
§ 371 (c)(1),
(2) Date: Nov. 27, 2017

(87) PCT Pub. No.: WO2016/189487
PCT Pub. Date: Dec. 1, 2016

(65) Prior Publication Data
US 2018/0159849 A1    Jun. 7, 2018

(30) Foreign Application Priority Data

May 26, 2015   (IT) .................. 102015000017938
Apr. 8, 2016   (IT) .................. 102016000036433

(51) Int. Cl.
*H04L 29/06*    (2006.01)
*G06F 21/86*    (2013.01)
*H04L 9/32*     (2006.01)

(52) U.S. Cl.
CPC .......... *H04L 63/0853* (2013.01); *G06F 21/86* (2013.01); *H04L 9/3268* (2013.01);
(Continued)

(58) Field of Classification Search
CPC . H04L 63/0853; H04L 63/083; H04L 9/3268; G06F 21/86
See application file for complete search history.

(56) References Cited

U.S. PATENT DOCUMENTS 9,275,204 B1 * 3/2016 Orr ................... H04W 12/0602
2007/0209072 A1 * 9/2007 Chen ...................... G06F 21/10
726/16

(Continued)

FOREIGN PATENT DOCUMENTS

CN    101369226 B    *  6/2012
CN    104 410 569 A      3/2015
WO    2014209357 A1    12/2014

OTHER PUBLICATIONS

Rogier: "system on chip—SOC for router like a d-link?—Electrical Engineering Stack Exchange"; Aug. 12, 2012, XP055240177 URL: http://electronics.stackexchange.com/questions/37679/soc-for-router-like-a-d-link.

(Continued)

*Primary Examiner* — Hee K Song
(74) *Attorney, Agent, or Firm* — Bay State IP, LLC

(57) ABSTRACT

A telecommunication system of the type wherein a series of terminals are mutually connected through a server and of a data transmission network characterised in that the management and the control of data management within the network are furthermore provided, with a single device made up of a SOC (System on Chip) processor to which the required support peripherals are associated.

14 Claims, 3 Drawing Sheets

(52) U.S. Cl.
CPC ...... *H04L 63/0209* (2013.01); *H04L 63/0272* (2013.01); *H04L 63/083* (2013.01); *H04L 63/0823* (2013.01)

(56) References Cited

U.S. PATENT DOCUMENTS

| | | | |
|---|---|---|---|
| 2010/0138909 | A1 | 6/2010 | Chen |
| 2011/0225625 | A1* | 9/2011 | Wolfson ................ G06F 21/40 |
| | | | 726/1 |
| 2012/0216034 | A1* | 8/2012 | Chen .................... H04L 9/0825 |
| | | | 713/153 |
| 2014/0047510 | A1* | 2/2014 | Belton .............. H04W 12/0609 |
| | | | 726/4 |
| 2014/0089650 | A1* | 3/2014 | Polzin ..................... G06F 12/14 |
| | | | 713/2 |
| 2014/0223569 | A1* | 8/2014 | Gail ........................ G06F 21/00 |
| | | | 726/26 |
| 2015/0095493 | A1* | 4/2015 | Xu .................... H04W 12/0808 |
| | | | 709/225 |
| 2015/0147972 | A1* | 5/2015 | Motto ................... H04L 63/105 |
| | | | 455/41.2 |
| 2015/0261975 | A1* | 9/2015 | Brumley ............... H04L 9/3242 |
| | | | 713/193 |
| 2016/0180114 | A1* | 6/2016 | Sastry ..................... G06F 21/85 |
| | | | 713/189 |
| 2016/0283313 | A1* | 9/2016 | Robertson ............. G06F 3/0629 |
| 2016/0295410 | A1* | 10/2016 | Gupta ................. H04L 63/1441 |
| 2016/0350549 | A1* | 12/2016 | Hampel ................ G06F 21/755 |
| 2017/0230350 | A1* | 8/2017 | Enrique Salpico ......................... G06F 21/6218 |

OTHER PUBLICATIONS

"DDR2200 Series Residential Gateway Installation and Operation Guide", Cisco Manual, Jul. 7, 2012, XP055240181 URD: http://www.cisco.com/c/dam/en/us/td/docs/video/at_home/IPTV/4036168_B.pdf.

"Functional Model of a Conditional Access System", EBU Review—Technical, European Broadcasting Union, Brussels, BE, No. 266, Dec. 21, 1995, pp. 64-77, ISSN: 0251-0936, Sections 1,4 and 5.

* cited by examiner

TELECOMMUNICATION SYSTEM FOR THE SECURE TRANSMISSION OF DATA THEREIN AND DEVICE ASSOCIATED THEREWITH

CROSS REFERENCE TO RELATED APPLICATION

This application is for entry into the U.S. National Phase under §371 for International Application No. PCT/IB2016/053084 having an international filing date of May 26, 2016, and from which priority is claimed under all applicable sections of Title 35 of the United States Code including, but not limited to, Sections 120, 363, and 365(c), and which in turn claims priority under 35 USC 119 to Italian Patent Application No. 102015000017938 filed on May 26, 2015 and Italian Patent Application No. 102016000036433 filed on Apr. 8, 2016.

The present invention is intended to protect an improved telecommunication system, particularly a telecommunication system able to operate on both public and private computer networks, in parallel to a conventional Internet connection in a secure and user-friendly manner. Also required is the protection for a device suitable to enable the univocal identification of the operator and, consequently, the authentication of the access credentials in said network.

Telecommunication systems, commonly sold in specialised stores or associated with the offer of phone operators, merely aimed at offering the access to the phone network, i.e. at detecting and transmitting the signal from and towards computers, are very well known in the art. Specific devices are also provided, arranged downstream of the device for signal detection and translation, which substantially have the aim of adapting the connectivity to user's needs, typically by limiting the potential for security needs. Such devices may be integrated to the detection and translation devices, or arranged downstream thereof.

Although the combination of the two devices provides per se the minimum access guarantees to the telecommunication network with the sufficient safety, considerable difficulties are constantly recognised in the customisation of activities and services, aimed at obtaining, for any type of user, a real connection server, with an operating system customised for the management of data flows, which allows to provide, in an integrated way, any service, preconfigured or installed on demand, optimising and thus solving present limitations in the equipment usually provided for the connection to the network.

Nowadays, computer procedures to create customised networks for different purposes are already used. For example, VPN (VPN=virtual private network) is a network built in order to make authentication mandatory for anyone who wants to access it. However, this method of connectivity management is limited by the hardware used by the user for navigation (computer, smartphone, tablet . . . ) which must be configured ad hoc, and by the fact it can only be accessed from a single point: the publicly open Internet network.

Security issues of a telematic network are also known, particularly with issues related to theft of credentials, money, personal information or with cyber-attacks to infrastructures on the Internet.

Currently, access to restricted areas of the Internet sites is related to the conventional practice of the combination of a username and a secret string associated to it. However, this system proved to be completely inadequate and inefficient, as demonstrated by recent cases of globally "wrongful acquisition" of such data from a very wide audience of unaware users.

Even the sensitive data management systems which, theoretically, should provide advanced protection mechanisms, have revealed their vulnerability in many cases.

Therefore, it is evident that the current conventional security systems (the so-called "security policies"), such as, for example, two-factor authentication, or the implementation of a VPN, are no longer adequate to user's needs.

In particular, this weakness is particularly unwelcome for IT development of commercial and financial activities, which, however, require the substantial certainty that no interceptions, identity thefts or the like take place.

In order to partly overcome these issues, measures to increase the security in commercial and banking transactions taking place via a telematic network have been developed by creating appropriate "second keys of identification and improvement of the operation", consisting in random combinations of numbers having temporary validity, issued by suitable computing devices, typically on display.

However, these systems appear cumbersome and, often, they are not reproducible in series: it is evident that it is not possible to solve the issues related to the protection of sensitive wide-ranging data (contacts with healthcare or law enforcement centres and the like) via such systems.

The object of the present invention is, therefore, to provide an integrated telecommunication system able to overcome the difficulties encountered to date in network arrangement, which is versatile and able to meet the most diverse requirements in the network architecture of computer communications. This makes it possible to manage and solve any issues concerning security, without neglecting any customisation which serves the purpose.

Said object is obtained through a telecommunication system having the features disclosed in the main claim, the dependent claims concerning the preferred features of the system.

A further object of the present invention is to provide an operator identification system in a computer network system based on a physical device allowing—on explicit user demand extremely easy access to the so-structured telematic network, allowing his univocal and secure identification, and thus ensuring the possibility to operate for all and just the desired time, without the need for other identification operations.

Said system is realised through a univocal identification and validation device of user credentials of the type consisting in a central processing unit, connected respectively to a component of permanent data memory and a working volatile memory, apt to house respectively the system software which manages the whole device and the correct processing of data for the operation of the device itself and the whole system, characterised in that a mechanical control device 4, which is apt to enable the user identity authentication process, is further associated with the central unit.

Finally, a further object is to allow operators on the Internet to verify that those who have access to the offered Internet services are secure and authorised users who can access the resource: in fact, the information system as a whole enables the verification of data property by an Internet operator, regardless of the data element of interest used exclusively by a person who owns a User Device to which said code is associated.

Said object is achieved by a validation method which follows the steps below:

configuration of the provider device so that a univocal identifier is defined for the website or the Internet service on which protection must be provided;

configuration of the device connected to the Central Information System through an Internet connection;

user accreditation at the website of said provider device in order to obtain valid credentials for accessing and sending the request of account protection to the Central Information System to which the User Device is connected;

reception by the Central Information System of the request, validation and resending to the Provider Device to which it is addressed;

data validation after an internal user recognition procedure and confirmation of the access credential's ownership through the management interface of its Provider device;

transmission to the user of the data related to the acceptance of his access protection request for the site requested by the Central Information System.

Other features and advantages will become clear from the following description and the dependent claims.

The invention is now described with reference to certain preferred embodiments, which are exemplary of its properties, but not limiting the protection scope of the solution itself. To support the description, the attached figures are provided, wherein.

Figure 1:
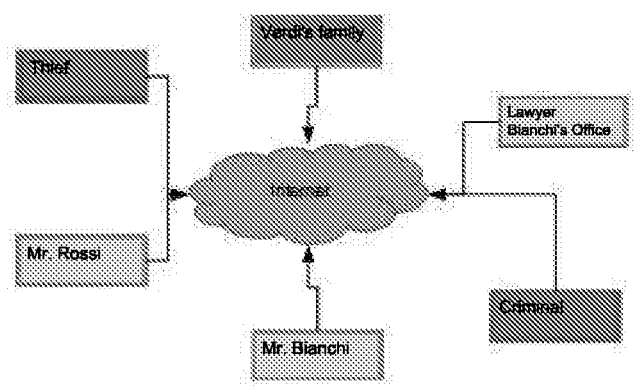
FIG. 1 is the schematic view of a conventional, simplified telecommunication system.

Conventionally, as shown in FIG. 1, it is expected that a telecommunication system has a connection among different individuals, belonging to the same network, located in different offices. To allow the operation of such connection, a network architecture that relies on the Internet connection must be provided: the central server enables communication with branch offices. Such network architecture, depending on its size, can be reproduced with a number of servers proportional to the needs in terms of data transfer and active users (the so-called "switching servers").

Figure 2:
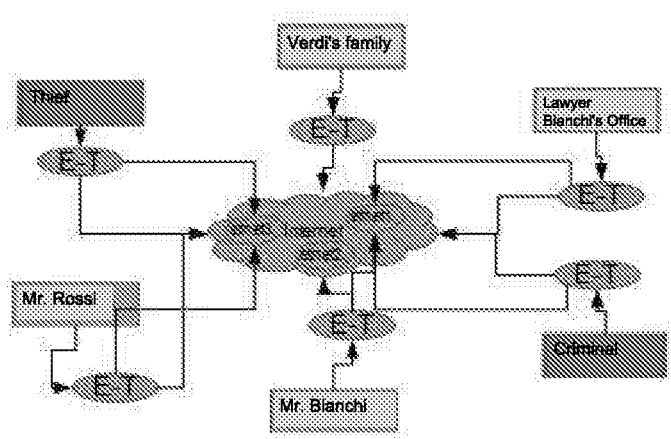
FIG. 2 is the schematic view of a telecommunication system according to the invention.
Figure 3:
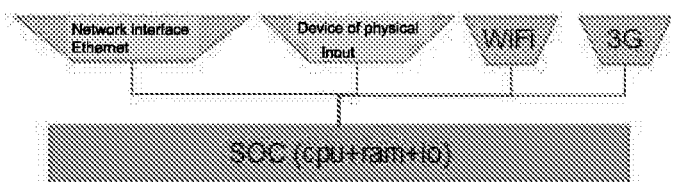
FIG. 3 is the schematic view of the generic architecture which unites all various types of device adopted for the connection within the telecommunication network according to the invention.

According to the telecommunication system provided, as shown in FIGS. 2 and 3, the network architecture is deeply modified compared to the conventional solution by means of a transmission management and control device, constituted by a SOC (System On Chip—System on a single chip) processor, to which the support peripherals are associated, according to existing needs, such as ethernet network cards, WiFi and mobile data networks.

The SOC processor is also composed of a CPU which provides the processing capacity of its own open operating system (such as Linux), which can be customised and modified according to specific user needs, so as to obtain the desired security and computational features. In addition, the appropriate programming changes may be made remotely at any time, in order to extend and improve functionality. All the devices necessary for the safe management of the telematic network accesses may be updated at any time when necessary.

It is well understood that it is possible to realise a protected telecommunication system: the particular configuration of the connection device enables, on the one hand, the identification of one or more networks to which only users having the appropriate programmed device can access and, on the other hand, it allows easy restricted access control for users who have been authorised by the individual manager of the specific network (hereinafter only manager) of interest.

Understandably, the manager may define the visibility parameters of the network itself, personally establishing the use he wants to make: private, public, open to few, all or only some users, free or paid.

The innovation of the system object of the present patent enables to suitably satisfy the increasing demand for security determined by the need to communicate and use digital services generally protected from the most common threats arising from viruses and hacking aimed at causing damage, real criminal conducts of all sorts.

Moreover, such a solution allows the network manager to provide the Internet services, to identify with certainty the connection point and, thus, the legitimate owner of the connection device itself, so as to uniquely define the principle of personal responsibility of the use of the Internet and to lay solid foundations to ban any illegal conduct, technically interrupting the illegal connection point in a quick and easy manner.

Thus, the connection device becomes the provider itself of the Internet connection and, as such, also the guarantor of owner identification and the guarantor of people providing a variety of services on the Internet, from websites to internal communications to large companies.

The presence of the physical device connected to it and the presence of the private cryptographic key identify the user with certainty and enable tracking of his traffic in case of need and, at the same time, allow the limitation of undesired access by third parties defending in a cost-effective, direct and fast way the whole telecommunication system.

In order to ensure the necessary security, the connection device makes use of all known information technologies (virtualisation, sandboxing, least privilege, protection provided by the underlying operating system and other specifically developed techniques) which are important elements also planned to ensure its own integrity, becoming inviolable even by the owner himself.

Physical-mechanical safety measures are also provided, such as external seals and internal electronic devices, apt to detect forced opening attempts of the device itself. The software system is programmed to operate autonomously in case of burglary, instantly deleting all data contained in it and, thus, becoming unusable.

Moreover, it has been observed that one of the maximum risk point of fraudulent access activity to a connection device is linked to the fact that in most cases this keeps some communication ports always open for service interventions such as making updates or checking and verifying the general functionality of the system. Inevitably, this need makes the network easily vulnerable.

To overcome this problem, it was also decided to provide a physical device external to the network connection device (router), suitable to allow the access to the network and the central server, only for the time in which the user intends to have the communication channel open, and to ensure a univocal identification of the credentials of the user himself.

Figure 4:
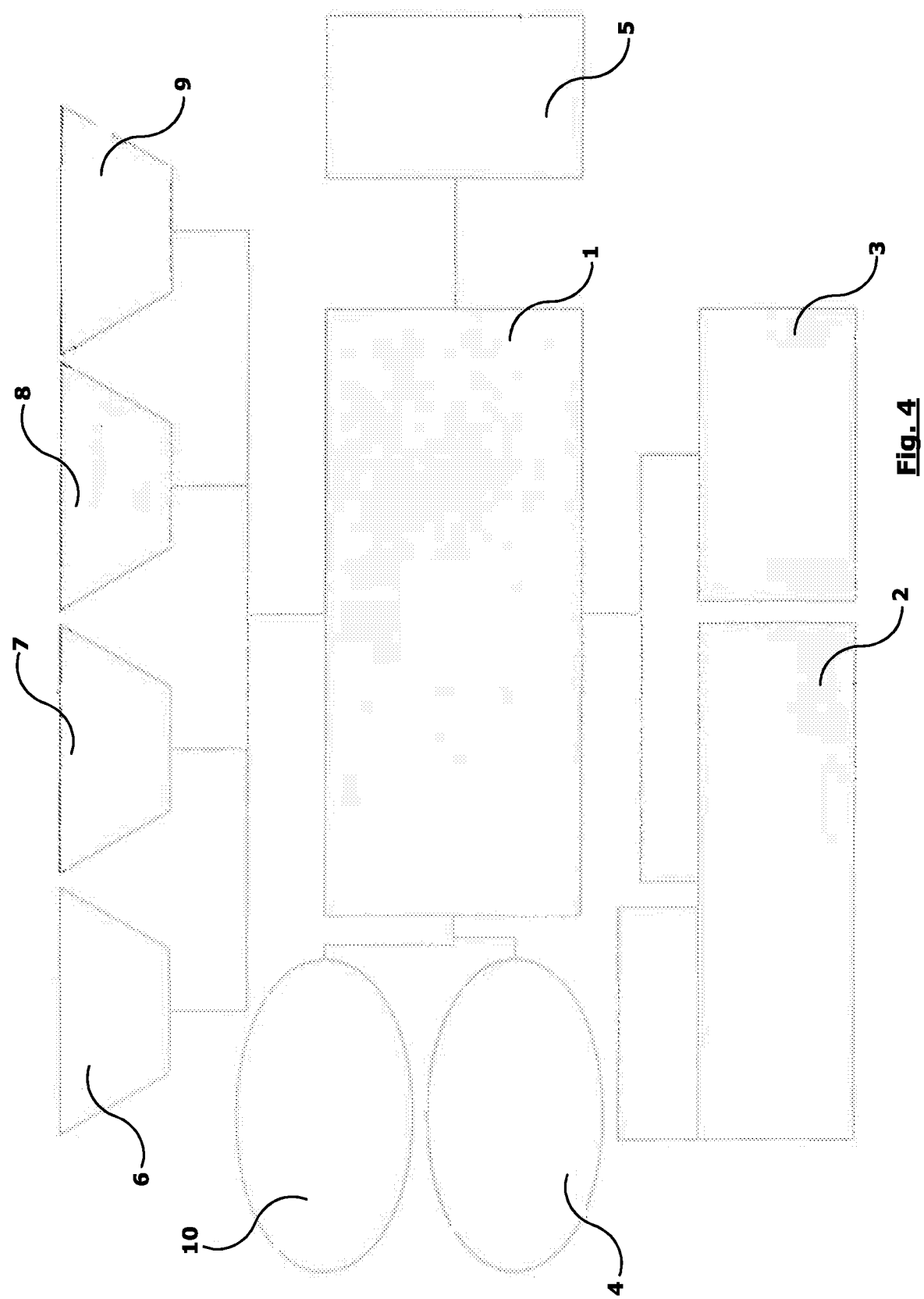
FIG. 4 is the view of the univocal identification device according to a preferred embodiment of the invention.
Figure 5:
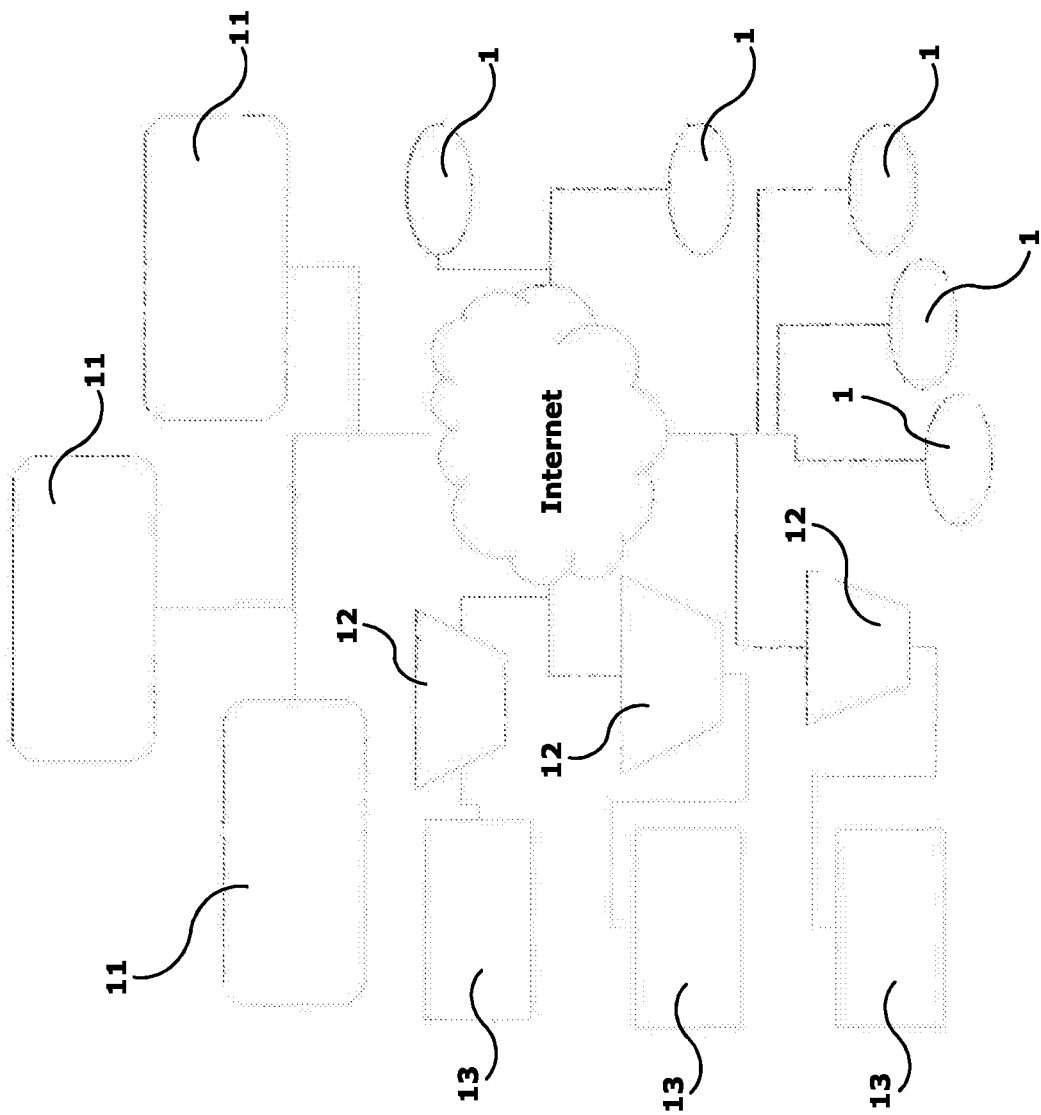
FIG. 5 is the schematic view of the architecture of credential identification verification information system connected to the device of FIG. 4.

As shown in FIG. 4, the univocal identification device is composed of a central processing unit 1, respectively connected with a component of permanent data memory 2 and a working volatile memory 3, apt to house respectively the system software which manages the whole device and the correct processing of the data for the operation of the device itself and the whole system.

Also associated to the central unit 1 are a mechanical control device 4, for example a push-button device, apt to enable the authentication process of the user's identity, and a screen 5 for displaying the device status and connection. The enabling mechanical device may also be associated to any operation perceived at risk for the integrity of the device itself, the data stored therein or the Internet services to which it is associated for verification operations in the use of private data.

Also connected to the central processing unit are connection ports of the device to the router for the access to the conventional telematic network: for example, as shown in the figure, a hotspot wifi module 6, a wifi connection module 7, an ethernet connection card 8 and a mobile network connection card 9 can be provided.

Finally, means of identification of the connection status 10 are preferably provided, such as signal lights of different colours allowing to immediately and unequivocally identify the various communication states, providing constant user confirmation of the connection mode in place.

The so-realised structure is understandably enclosed in a rigid protective casing, provided with suitable holes in order to maintain its proper functionality.

As anticipated, the device is associated through the router to a distributed information system interconnected through a telematic network aimed at verifying the legitimacy of use of personal access data and, consequently, selecting the services and the authorised Internet multimedia contents. The above mentioned information system is schematically illustrated in FIG. 2.

The system is composed of a set of communication and data processing nodes 11, mutually connected, with a variety of devices 1 according to the invention and with devices 12 managed by the providers, i.e. servers on which a communication software is installed, allowing them to query the central information system on the legitimacy of an access through the Internet network, with which the devices 1 have the need to work in order to make commercial transactions, digital signatures, etc. To ensure system security, the telematic connection is secured through the encryption of data in transit.

Therefore, the role of the central information system is to act as a bridge between the devices managed by providers and customer systems: the devices managed by providers may query the customer systems through the central information system and have the necessary confirmations to make the transaction.

The possible queries are strictly controlled by the Central Information System, so that the provider's system will never interact directly with customer systems and damage them, voluntarily or involuntarily or even obtain data from customer information systems.

In addition, the Central Information System is responsible for the recognition and enabling of the peripheral systems which connect to it. Therefore, the connection of peripheral systems to the Central Information System takes place only after respective owners have identified and obtained the access credentials, stored in the peripheral systems themselves. The identification of the Customer and Provider peripheral systems takes place through signed digital certificates installed on the peripheral devices and recognised by the Central Information System during connection.

For the operators offering services on the Internet, in order to take advantage of the security services and secure communication offered by the system described herein, it is sufficient to install, at the Internet presence centres, a node for the provider device after the authentication and authorisation at the Central Information System. In particular, a management interface is provided, enabling the manager to perform the allowed operations towards the Central Information System, such as the management of the requests from the user's devices of credential validation at its own infrastructure.

The combination of the system and the device connected to it allows the user to monitor the intervention period. Therefore, security is guaranteed by a deliberately activated command which is valid for a certain time necessary to the only required intervention.

The security of the communication network created by the present device is also essentially linked to a user's certification process. Similarly to when an SSL certificate is delivered to certify a website, each user of the telecommunication system accessible only by means of the device must be certified by the manager of the system itself through the issuing of a certificate. Such computer certificate identifies the device for which it was delivered and its owner. Such certificate may be revoked and this implies the immediate disconnection and the impossibility of any further use of any services associated to it. The device, in fact, allows the access only to those telecommunication networks which have a valid certificate, issued by the provider of the networks themselves.

To manage certificate issuing and management requests, the present solution realises a simplified, innovative procedure of request, acquisition and use of digital certificates, which requires no specific technical knowledge, thanks to the specific features of the patent device, allowing the end user to acquire in a short time, with simplified steps and transparently the certificates he has required.

An important immediate benefit resulting from certificate management as conceived, invented and programmed in this patent is to make the network accessible from any connection location and with any kind of device used to surf the Net.

The network management task provided by this innovative telecommunication system allows to customise at will the type of allowed access without any geographical and technological limit concerning the hardware used, and being able to intervene cost-effectively, safely and quickly to apply any additional changes.

Therefore, it is possible to provide for more articulated and complex structures, such as, for example, in the case of a large company with particularly stringent safety requirements. Usually, in these situations, protection from the public open network by conventional connection systems involves the use of SSL and authentication through certificates that are installed via software on the computers and devices typically used by employees to access the corporate network and certification, in fact, of access to services therein.

This procedure fully constrains the use of the specific configured device, thus complicating the connection and making it impossible in case of any failure of the same.

With the solution described herein, however, it is possible to overcome the obstacles that usually appear, such as the need to install client certificates on all used devices and the inability to access the network via mobile phone systems, that do not support client certificate authentication. Therefore, obvious web server vulnerabilities and compatibility issues between commonly used applications can occur, making authentication with certificates a clear obstacle to the use and perfect management of the purpose for which they are installed: network security.

The innovative system now realised allows to associate to each terminal a communication device allowing the simultaneous access to the internet network and the corporate network, without the need of additional virtual structures, by conventional connection. Therefore, the communication between the individual devices and the central server takes place by means of a dedicated channel of the phone network, in fact separated from the conventional Internet connection. The latter takes place anyway, and at the same time, but on another channel.

The configuration of the data transmission device thus allows the user to have no perception of the dual communication system, without having to prepare special settings on the used devices. Conventional connection to the network manager to whom he subscribed is sufficient.

Moreover, the connection device is structured for adding functionality to an internet connection: it is therefore arranged to constantly control the incoming and outgoing traffic, in order to automatically identify any anomalies that can be recognised as behaviours implemented in the course of connection to information systems. In this case, the device blocks all types of traffic—incoming and outgoing—that may pose any form of concern. The scan applies in particular to web traffic, malware or computer viruses search, e-mail, transmission of attachments or access requests from remote systems.

The main feature of the system now realised is to make it easy to create protected communication networks with strong encryption technologies, based on public-and-private key technology. The following describes connection devices that enable the creation of secure networks considering a typical case of use. This case of use is applicable to networks of any size, from corporate networks to geographical ones with many data centres, private or open to the public, free or paid.

The creation of a network with the planned connection device for the system described herein always involves three actors:
1. The end user, owner of a dedicated connection device.
2. The manager of the network to be accessed.
3. The connecting device makers who license the ability to use it to access a proprietary network.

After the end user has purchased a dedicated connection device, designed for the telecommunication system now described, he connects it to its ADSL router or via mobile connection (through a data SIM card inserted in the device) and accesses the web interface for the initial configuration. After completion of this first step, the end user can surf the Internet normally.

When the end user decides to connect to a secure network, such as offering video content or music, the user selects from the interface of the dedicated connection management the network of choice among the many possible and fills in a connection request comprising personal data, a phone number and a one-time password. At this point, the device automates all technically complex steps of the certificate request and sends the CSR (Certificate Sign Request) to the network manager.

The network manager then receives the connection request complete with data, verifies them and issues a certificate authorising the user to connect to its network. The dedicated connection device receives the certificate, transparently to the user, and asks the user to enter the one-time password for the release of the certificate. At this point, the dedicated access device connects to the selected network and allows the user to freely enjoy not only the Internet but also the network of specific interest, using the appropriate names. Each network will have dedicated top-level domains to distinguish it from the others.

In order for the network to be visible to the owners of the various dedicated connection devices, the manager must request their entry to system owners.

Such telecommunication system and the programming of its dedicated connection device include protection mechanisms designed to detect malicious activities and revoke access certificates with immediate effect, in order to block potential attackers.

In the case of corporate networks, the system is relatively simpler, since the actors are just the network manager and the end user.

Similarly to the Internet, in the case of corporate networks, the network manager buys a certain number of dedicated connection devices to distribute to employees, to connect to the corporate network from home or while travelling, programming them so that they are already properly configured for access to the remote connection server and issuing a certificate for each user. By means of the internet connection via any modem, the end user is now connected to the corporate network, completely transparently, and can continue anyway to surf the Internet without any problems.

The device and system now described have a relatively simple operation, which is described below.

First, certain prerequisites must be met so that the device and the system can be effective:

the website manager has put the provider device in place and obtained a univocal identifier for the website or the internet service to be protected;

the customer has purchased and properly configured the User Device, connected to the Central Information System through an Internet connection;

the user is then identified and identity is kept in the device in his possession and sent to the Central Information System at the time of connection of the User Device itself.

Once these prerequisites are satisfied, the user can request the protection of the access data element to the web operator's website.

In order to protect the user, the system stores and protects only the username and not the password, which is known only by the user and which is recorded on the information system by the Internet operator, owner of the website for which the user wants to protect access to the restricted section.

Subsequently, the procedure follows the steps outlined below:

the user has registered or must register to the Internet operator's website in order to obtain valid access credentials;

the user accesses the management interface of its User Device and executes the "login protection" function;

the user selects the website and enter the username credential, then sends the account protection request to the Central Information System to which the User Device is connected;

the Central Information System receives the request, validates it and resubmits it to the Provider Device to which it is addressed, that to which the website in the request pertains;

the Internet operator, manager of the website, receives a data validation request by the Central Information System on its Provider Device. The request contains data required for user identification;

the website operator validates the data element after the internal user recognition procedure is performed and confirms the ownership of the access credential through the management interface of its Provider Device;

the Central Information System receives confirmation and internally associates the given username of the particular Internet operator to the univocal identifier of the User Device from which the request was sent;

the user is informed by the Central Information System on his User Device of successful acceptance of its site access protection request.

At the end of this process, the user may choose to associate the mechanical device on its device to site access with the now protected credential.

There is a second procedure allowing a user to protect his access data for an Internet service. The procedure involves the user's registration with the Internet provider through the user device and takes place as follows:

the user accesses the device management interface and executes the "register with Internet operator" feature;

the user selects the operator and the service provided to register to, such as a website;

the user enters the user ID and access password of choice and sends data;

the user device transmits the data entered by the user and personal or corporate information of the user himself to the Central Information System;

the Central Information System sends the provider device the above-mentioned data input by the user, as well as personal or corporate user data;

the provider device performs data registration at the service requested and gives confirmation to the Central Information System;

the Central Information System records the provider ID and username as protected;

the Central Information System informs the user device about performance of the registration request and of its successful outcome and can show the new profile among those protected;

the user can choose whether to associate access to the mechanical action of the control device on the User Device.

When the user has performed the operations necessary to enable login protection on an Internet service access supported by the system the patent relates to, the user can normally log in. In order for the login operation to be successful, it is necessary that the User Device to which the username and Internet operator ID data are associated is connected to the Internet on the same network and is connected to the Internet on the same connection (same outgoing IP/IPv6 Internet address) on which the user is connected to log on to the service or website protected according to the invention.

It is understood that all features described are now offered in an absolutely transparent way to the end user, who is not required to have any specific technical skills to benefit from the services of the device that constitutes the cornerstone of the system according to the invention.

It is also included that the described solution now makes this task possible thanks to the fact it concentrates multiple security and access control features, normally requiring configuration and installation of a multitude of devices and/or dedicated software of complex operation, that is all those devices that access the same device, in a single object.

Typically, only those having a device according to the invention on which a certificate is installed by those in control of private network accesses will be able to access that network. In case of theft or loss, the procedures for the withdrawal are very simple, similar to those in the case of loss of a credit card.

Moreover, the particular shape of the device prepared for the telecommunications system described herein is such as to make the risk of telematic infringements substantially null: computer security is in fact sold in a device. It is in fact able to block any unknown D-DOS (Distributed Denial Of Service) activity, typically used by malicious organisations to knock websites or other types of services offline.

In summary, the telecommunication system thus realised achieves the intended aims, and other unexpected, but not less important, advantages. In particular, it offers a secure access to resources normally available on computer TCP/IP networks such as the Internet. Access through the system just described is performed in a transparent way to one or more private networks with strong authentication based on digital certificates and possible withdrawal by public CRL (Certificate Revocation List). All network services available thus become usable in safety conditions, without the need for special devices or technical skills. In case of device loss, revocation of installed certificates ensures the impossibility of reusing it maliciously to damage the company that owns it.

It is possible to obtain a dual connection system, in which the device separates communication with the corporate network from the Internet connection, without a data management difference being clearly identifiable by the user.

The system involves the identification of the devices associated with the dual connection system, and of those suitable for connection to only one of the networks. An encrypted cloud system is also provided for devices authorised to connect through the telecommunication system now described. Unlike clouds for storage of existing data, encryption is performed on the connection device, and not on remote servers. The advantage of this is given by not having to store the encryption keys on remote servers, but only and exclusively on the device.

The device in question also provides other security features, albeit secondary, but useful in a context where security needs are highest.

Using the communication device together with a dedicated network for the purpose, it is possible to make a true anonymous connection, based on the NAT, without the need to be based on various level proxies. The service is provided with the external server support, always transparently to the user, without any particular limitations typical of other TOR-type anonymity services. Unlike existing illegal anonymisation networks, the device network in question is perfectly legal, since users will go through the previously exposed identification mechanisms.

It was also envisaged that owners can use an exclusive webmail through a WEB interface. In this way, it is possible to send electronically signed e-mails via S-MIME certificate. Normally, the e-mail signature feature is complex and uncertain, as it is a mandatory requirement that the signing certificates are sent on the servers on which the webmail is hosted, therefore no exclusive ownership of the signing certificate is provided: this procedure slows the spread of digitally-signed e-mails.

With the device object of the patent, both the webmail and the certificate are located on the same device and e-mails are automatically signed without any technical difficulties. The signing certificate can be requested with the same, simple modes of certificates for connection to the control centre to which all devices are connected.

The signing certificates in the device may also be used to sign electronic documents via a web interface or software installed on a personal computer, tablet or mobile phone.

The planned additional features may be subject to the control by the control device, so as to prevent the use of the feature by malicious users, without the user's knowledge.

All exposed additional features can be comfortably viewed through the wired or wireless electronic network, established between the device and the user's personal computer or equivalent.

To allow communication between servers, the various terminals of the central offices and branch offices, overcoming the respective speed problems linked to the use of the band by other users and security, simply configure the device according to the IP-bridge mode. In fact, it is possible to obtain, in a simple and transparent way, the association of a public IP to the target servers, which are then available from anywhere in the world.

Finally, the system thus formed may provide for the use of a physical device to be interposed between a home or corporate computer network and the Internet, or to be integrated within the electronic devices necessary for the access to and use of the telecommunications system itself, such as personal computers, cell phones, tablets, modems, routers, and Internet access devices in general.

Summing up the new system allows to create communication procedures to define the behaviour of the entire system through the exchange of messages between devices managed by providers and the Central Information System and the customer systems and the Central Information System, in order to be able to protect the personal data that users keep on user devices.

Furthermore, other advantageous features are recognised, such as
secure access features from Internet services, which support the feature via a Provider Device, to the user owning a User Device connected to the Central Information System. This feature helps protect normal access with username and password to websites or Internet services in such a way that only the rightful owner of the credentials is able to log in. This is enabled by the fact that credentials are associated to the user device of the rightful owner of the same. Credential theft does not involve the danger of unauthorised access to protected resources according to the invention. Furthermore, the user owner of the credentials may limit access to the Internet service to which the data element grants access to the mechanical control device.
Registration features for users certified by Internet operators participating to the information system object of this patent. The aim of this feature is to allow Internet operators having a Provider Device correctly installed within their Internet infrastructure to receive user registrations directly from the Central Information System, bypassing the ordinary web channels, where it is difficult to verify the accuracy of data entered by a user. The user registers with the internet operator directly by directly selecting it from the management GUI of its User Device and with fewer complications, since his data are already present in the device and will be sent, upon confirmation of the rightful owner, to the Internet operator through his Provider Device.
Protection of alphanumeric or numeric codes associated with electronic payment cards. By adopting the device according to the present invention, payment systems managers may easily associate an electronic payment card number to the owner of the user device of the same, then they could easily verify that the request for money transfer is made from an Internet connection to which the device associated to that number is connected. In this way, the use of a credit card number would be bound to the ownership of the device where this card is registered by the issuing company and bound to the action on the mechanical device giving a certain identification.

In order to prevent unauthorised use of an electronic payment card through the Internet, the system object of the patent can be used to verify that the user making the payment is the legal owner of the payment card. The association of an alphanumeric code of an electronic payment card to the User Device takes place in a manner identical to that of an access credential, with the only difference that the code is not associated with an Internet domain, or equivalent information necessary to identify a provider. Thus, the company issuing the card will receive a card code claim request, verifying the owner's identity and that the card is his possession and will confirm the request to the Central Information System. The Central Information System internally associates the card code to the particular user and informs the User Device from which the request is issued of successful completion of the operation. In this way, the user may associate at will the pressure of the mechanical device to payments made with the electronic payment card whose code has been correctly claimed by the issuing company through the User Device. Operators offering electronic payment services on the Internet will, by interfacing with the card issuing company, check that the identification code of the payment card is associated to the device and request the user's mechanical action, so that only the device associated to the card can authorise payment.

The possibility exists that the same features of the user's device are carried out within a mobile communication device, such as mobile phone, a smartphone or a tablet. In this case, the manual control device is identifiable with an appropriate "button" indicated on the touch screen, which is displayed by means of a specific software application that simulates in fact the device now described. Once the application is launched, the mobile communication device becomes a univocal identification and user credentials validation device itself, thus connecting through the Internet—to the Central Information System. Moreover, the software would also provide all features required for the recording of data access and personal alphanumeric codes within the software itself.

In the light of the above, it is evident that the solution does not require the presence of specific software, allowing to directly resolve a private IP, the connection to the system now described already allowing network identification.

The system and the related identification and user validation device has not only a router function, since it provides for user identification, thanks to the univocal keys provided on the device itself. Secondly, content access method is different with respect to conventional methods, because it occurs outside of an Internet network: exchange information, in fact, does not require the presence of a browser, as is the case for a conventional VPN.

The identification element is therefore a personal device containing the keys to access the private network, external to the Internet, identifying a standalone structural element.

Therefore, a self-supported system parallel to the Internet is identified, which is still able to take advantage of the space granted to the Internet.

From the above description, it is well understood that all the objects of the invention have been achieved, and that several changes can be made to the embodiments now described, without departing from the scope of protection as defined by the claims.

The invention claimed is:

1. A telecommunication system of the type comprising a series of terminals mutually connected through a server and of a data transmission network, characterised in that means for the management and the control of data management within the network are furthermore provided, said means consisting of a single connecting device made up of a SOC (System on Chip) processor associated to the required support peripherals and a univocal user credentials identification and validation device connected to said SOC processor are associated;
  wherein the telecommunication system further comprises a user-identification, univocal, private cryptographed key system which accurately identifies users and enables tracking of traffic;
  wherein the connecting device further comprises a plurality of visibility parameters for customizable access to enable the identification of one or more networks; and
  wherein the univocal user credentials identification and validation device further comprises signal lights to identify and view various connections status.

2. The telecommunication system as in claim 1 characterised in that a public-private-key, access-password, double-authentication system is provided.

3. The telecommunication system as in claim 1 characterised in that said SOC processor is provided with a customizable open-source operating system.

4. The telecommunication system as in claim 3 characterised in that said SOC processor is apt to identify at least one network to which only users having a specific device of identification and validation of a user's credentials access in order to establish the connection with the networks for which it has authorisation.

5. The telecommunication system as in claim 1 characterised in that on said means for the management and control of data transmission there are provided devices with access opening control for the remote access to said means for the management and control of data transmission only for the time in which a user intends to have a communication channel open, and to ensure a univocal identification of the credentials of the user himself.

6. The telecommunication system as in claim 1 characterised in that physical safety means comprising external seals and internal electronic devices apt to detect attempts to physically open the connecting device and to proceed with the cancellation of all the data contained therein.

7. The telecommunication system as in claim 1 characterised in that a cryptography activity is performed on the connecting device.

8. A univocal user credential identification and validation device for a telecommunications system as defined in claim 1 characterised in that it is composed of a central processing unit (1), connected respectively to a component of permanent data memory (2) and a working volatile memory (3), adapted to house respectively the system software that manages the entire device and correct data processing for the operation of the device itself and of the entire system, to a central unit (1) also being associated to a manual control device (4) adapted to enable the user identity authentication system process.

9. The user credential univocal identification device as in claim 8 characterised in that said manual control device is constituted by a push-button device.

10. The user credential univocal identification device as in claim 8 characterised in that said central processing units are further connected to connection ports of the univocal identification device to a router, for access to a conventional telematic network comprising a hotspot wifi module (6), a module for wifi connection (7), an ethernet connection card (8) and a mobile network connection card (9).

11. A method of univocal assignment of the credentials of a user in a system of claim 10, characterised in that the following steps are provided:
  configuration of a provider device so as to define a univocal ID for a website or Internet service to be protected and connect it to a Central Information System through an Internet connection;
  user's accreditation at the website of said provider's device in order to obtain valid credentials for accessing and sending the request of account protection to the Central Information System to which a User Device is connected;
  validate the request from the Central Information System and resend it to the Provider Device for which it is intended;
  validate a data element after an internal procedure of user recognition and confirm an access credential's ownership through a management interface of its Provider device;
  inform the user of the successful acceptance of his protection request for access to the requested website.

12. The method as in claim 11 characterised in that, once a buyer's identity is registered, it also involves the step of associating the access to said system and to the univocal identification device action.

13. The method as in claim 11 characterised in that the following further steps are provided:
  proper data element validation at an Internet service provider;
  connection of the user device to the same network on which the same logs on to the internet;
  Internet access with an appropriate software for a protected resource by entering the correct access credentials and username and password verification by the resource to be accessed;
  sending an ownership verification request to the Central Information System, including recognition data (provider ID, data element to be verified and IP or IPv6 address from which a remote user is connected to the resource through the Internet operator);
  identification of one or more remote users connected to it through their own User Devices by the IP or IPv6 address reported in the original request;
  identification of the correct user device to which the data element whose ownership is to be verified is associated;
  sending by the Central Information System to the selected user devices, together with the data element to be verified, of a request for authorisation to use the identifying data element kept inside them;
  enabling the use of the data element by the user by operating the device;
  waiting by the Central Information System for an affirmative response to the request from at least one of the selected devices;
  once a response is obtained, sending the Provider Device originating such request from the Central Information System a positive acknowledgement for the data element use request;
  enabling the use and consultation of the data element by the user requesting the protected resource.

14. The user credential univocal identification device as in claim 8 characterised in that said data memory components enclose data for identification and univocal validation of a user's credentials and personal univocal identification alphanumeric codes.

\* \* \* \* \*